(12) United States Patent
Koga et al.

(10) Patent No.: US 11,456,770 B2
(45) Date of Patent: Sep. 27, 2022

(54) WIRELESS TERMINAL COVER

(71) Applicant: FCNT LIMITED, Yamato (JP)

(72) Inventors: Yohei Koga, Yamato (JP); Ken Shoji, Yamato (JP); Norio Ozaki, Yamato (JP)

(73) Assignee: FCNT LIMITED, Yamato (JP)

( * ) Notice: Subject to any disclaimer, the term of this patent is extended or adjusted under 35 U.S.C. 154(b) by 0 days.

(21) Appl. No.: 17/560,704

(22) Filed: Dec. 23, 2021

(65) Prior Publication Data

US 2022/0158680 A1    May 19, 2022

Related U.S. Application Data

(63) Continuation of application No. PCT/JP2020/042518, filed on Nov. 13, 2020.

(51) Int. Cl.
| | | |
|---|---|---|
| *H04B 1/38* | (2015.01) | |
| *H04B 1/3888* | (2015.01) | |
| *H01Q 21/08* | (2006.01) | |
| *H01Q 21/22* | (2006.01) | |

(52) U.S. Cl.
CPC .......... *H04B 1/3888* (2013.01); *H01Q 21/08* (2013.01); *H01Q 21/22* (2013.01)

(58) Field of Classification Search
CPC ....... H04B 1/3888; H01Q 21/08; H01Q 21/22
See application file for complete search history.

(56) References Cited

U.S. PATENT DOCUMENTS

| | | | |
|---|---|---|---|
| 6,470,174 B1 | 10/2002 | Schefte et al. | |
| 9,207,715 B2 * | 12/2015 | Filipovic | G06F 1/163 |
| 10,437,295 B1 * | 10/2019 | Filipovic | G06F 1/183 |
| 10,840,964 B2 * | 11/2020 | Mizunuma | H04B 5/0056 |

(Continued)

FOREIGN PATENT DOCUMENTS

| | | |
|---|---|---|
| CN | 106921023 A | 7/2017 |
| CN | 109659670 A | 4/2019 |

(Continued)

OTHER PUBLICATIONS

International Search Report dated Dec. 22, 2020, issued in counterpad International Application No. PCT/JP2020/042518 (3 pages).

(Continued)

*Primary Examiner* — Junpeng Chen
(74) *Attorney, Agent, or Firm* — WHDA, LLP

(57) ABSTRACT

A wireless terminal cover is attached to a plate-like wireless terminal. The wireless terminal cover includes a bottom part that is in contact with the backside of the attached wireless terminal while covering the backside and is made of a dielectric having a relative dielectric constant of 1 to 10, wall parts that are in contact with the sides of the attached wireless terminal while surrounding the sides and are made of the dielectric, and a plurality of conductive elements placed in line on at least one of the bottom part and the wall part. The conductive elements are formed such that the length of the longest one of lines, each of which connects any two points on the conductive elements, is 0.1 to 0.4 times the effective wavelength of radio waves in the dielectric, the radio waves being used for radio communications by the wireless terminal.

9 Claims, 33 Drawing Sheets

(56) References Cited

U.S. PATENT DOCUMENTS

| | | | | |
|---|---|---|---|---|
| 2012/0212896 | A1* | 8/2012 | Schulz | A45C 11/00 |
| | | | | 361/679.02 |
| 2013/0063873 | A1* | 3/2013 | Wodrich | H05K 7/00 |
| | | | | 361/679.01 |
| 2013/0076614 | A1* | 3/2013 | Ive | H04M 1/7246 |
| | | | | 710/15 |
| 2014/0266924 | A1 | 9/2014 | Hwang et al. | |
| 2014/0334098 | A1* | 11/2014 | Lauder | G06F 1/1601 |
| | | | | 361/679.56 |
| 2019/0288377 | A1 | 9/2019 | Ying et al. | |
| 2020/0119432 | A1* | 4/2020 | Mizunuma | G06F 1/1647 |
| 2020/0119760 | A1* | 4/2020 | Mizunuma | H04B 1/0064 |
| 2020/0221839 | A1 | 7/2020 | Hwang | |
| 2021/0391640 | A1* | 12/2021 | Mizunuma | H01Q 1/2266 |

FOREIGN PATENT DOCUMENTS

| | | |
|---|---|---|
| CN | 111146583 A | 5/2020 |
| JP | 2008-11377 A | 1/2008 |
| JP | 2014-179614 A | 9/2014 |
| JP | 2019-536377 A | 12/2019 |
| JP | 2020-65245 A | 4/2020 |
| KR | 102079751 B1 | 2/2020 |

OTHER PUBLICATIONS

Written Opinion of the International Searching Authority dated Dec. 22, 2020, issued in counterpart International Application No. PCT/JP2020/042518, with English partial translation (5 pages).

Decision to Grant a Patent dated Jul. 26, 2021, issued in counterpart JP application No. 2021-537817, with English translation (5 pages).

\* cited by examiner

FIG. 17

|  |  | SHIFT AMOUNT IN LATERAL DIRECTION (mm) | | | | | | |
|---|---|---|---|---|---|---|---|---|
|  |  | -3.8 | -2.85 | -1.9 | 0 | 1.9 | 2.85 | 3.8 |
| SHIFT AMOUNT IN LONGITUDINAL DIRECTION (mm) | 2.19 | 8.9 | 8.9 | 9 | 9.57 | 9 | 8.9 | 8.9 |
| | 1.46 | 10 | 10 | 10.1 | 10.4 | 10.1 | 10 | 10 |
| | 0.73 | 10.6 | 10.6 | 10.6 | 10.7 | 10.6 | 10.6 | 10.6 |
| | 0 | 10.7 | 10.7 | 10.7 | 10.6 | 10.7 | 10.7 | 10.7 |
| | -0.73 | 10.6 | 10.6 | 10.6 | 10.7 | 10.6 | 10.6 | 10.6 |
| | -1.46 | 10 | 10 | 10.1 | 10.4 | 10.1 | 10 | 10 |
| | -2.19 | 8.9 | 8.9 | 9 | 9.57 | 9 | 8.9 | 8.9 |

WIRELESS TERMINAL COVER

CROSS-REFERENCE TO RELATED APPLICATION

This application is a continuation application of International Application PCT/JP2020/042518 filed on Nov. 13, 2020 and designated the U.S., the entire contents of which are incorporated herein by reference.

FIELD

The embodiments discussed herein are related to a wireless terminal cover.

BACKGROUND

Wireless terminals such as a smartphone have been widely used in recent years. For such wireless terminals, various techniques for improving antenna performance have been proposed.

For example, a technique for broadening the band of a patch antenna by providing a floating patch for the housing of a smartphone is proposed (See, for example, Japanese National Publication of International Patent Application No. 2019-536377). A technique capable of securing antenna performance even for a metallic housing of an electronic device is proposed, the antenna performance being secured by spacing islands, which contain metallic substances, on a base containing non-conductive substances in a part of the housing of the electronic device (see, for example, Japanese Laid-open Patent Publication No. 2014-179614). A technique for providing an antenna for the cover of a smartphone is proposed (See, for example, Japanese Laid-open Patent Publication No. 2020-065245).

[Patent document 1] Japanese National Publication of International Patent Application No. 2019-536377

[Patent document 2] Japanese Laid-open Patent Publication No. 2014-179614

[Patent document 3] Japanese Laid-open Patent Publication No. 2020-065245

SUMMARY

An aspect of the disclosed technique is illustrated by a wireless terminal cover as follows. The wireless terminal cover is a wireless terminal cover to be attached to a plate-like wireless terminal, the wireless terminal cover including a bottom part that is in contact with the backside of the attached wireless terminal while covering the backside and is made of a dielectric having a relative dielectric constant of 1 to 10, wall parts that are in contact with the sides of the attached wireless terminal while surrounding the sides and are made of the dielectric, and a plurality of conductive elements placed in line on at least one of the bottom part and the wall part, wherein the conductive elements are formed such that the length of longest one of lines, each of which connects any two points on the conductive element, is 0.1 to 0.4 times the effective wavelength of radio waves in the dielectric, the radio waves being used for radio communications by the wireless terminal.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 17 illustrates the simulation results of the third simulation;

DESCRIPTION OF EMBODIMENTS

For wireless terminals such as a smartphone, covers are frequently used for protecting and decorating the terminals. Wireless terminals stored in covers may decline in antenna performance.

An object of an aspect of a disclosed technique is to provide a wireless terminal cover while suppressing a decline in the antenna performance of a wireless terminal stored in the cover.

Embodiment

The configuration of an embodiment described below is merely exemplary, and the disclosed technique is not limited to the configuration of the embodiment. For example, a wireless terminal cover according to the embodiment has the following configuration. The wireless terminal cover according to the present embodiment is a wireless terminal cover to be attached to a plate-like wireless terminal. The wireless terminal cover includes a bottom part that is in contact with the backside of the attached wireless terminal while covering the backside and is made of a dielectric having a relative dielectric constant of 1 to 10, wall parts that are in contact with the sides of the attached wireless terminal while surrounding the sides and are made of the dielectric, and a plurality of conductive elements placed in line on at least one of the bottom part and the wall part. The conductive elements are formed such that the length of the longest one of lines, each of which connects any two points on the conductive elements, is 0.1 to 0.4 times the effective wavelength of radio waves in the dielectric, the radio waves being used for radio communications by the wireless terminal.

The wireless terminal cover configured thus allows the conductive elements to act as resonators for the antenna of the wireless terminal. The wireless terminal cover including the conductive elements place in line can immediately increase a probability that the conductive elements are located near the antenna even if the location of the antenna in the wireless terminal is not identified. In other words, the wireless terminal cover can increase a probability that the conductive elements are operated as resonators even in the wireless terminal where the location of the antenna is not identified, so that the conductive elements operated as resonators can improve the actual gain of the antenna.

Figure 1:
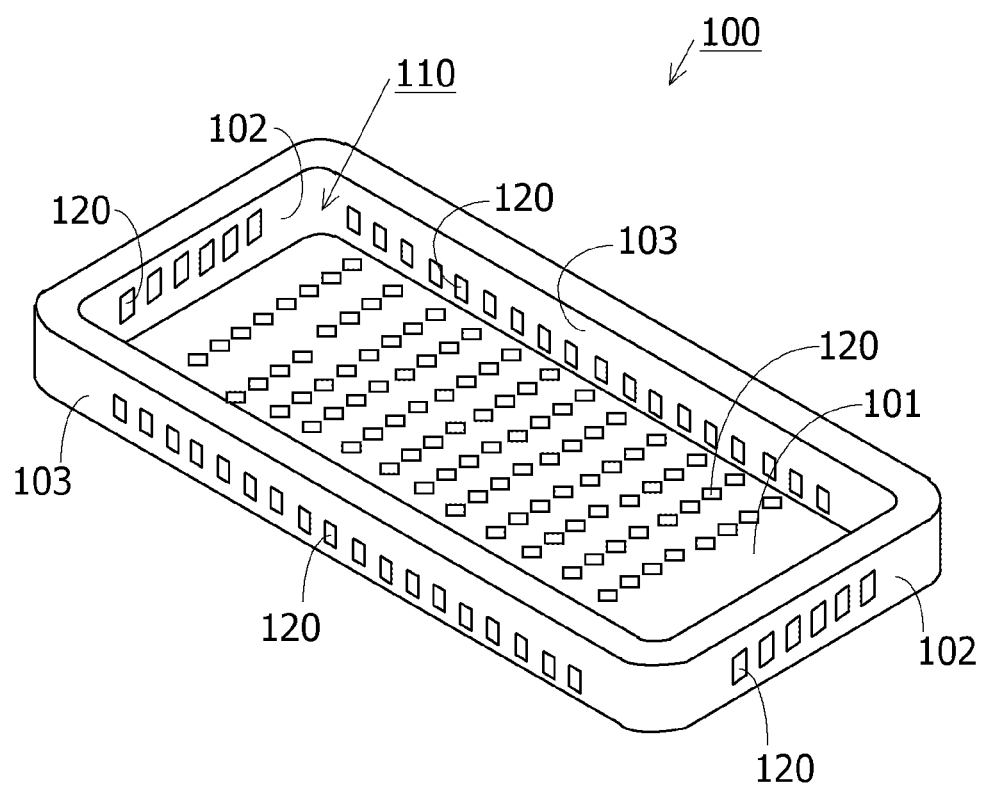
FIG. 1 illustrates an example of a smartphone cover according to an embodiment.

The embodiment of the wireless terminal cover applied to a smartphone cover will be described below with reference to the accompanying drawings. FIG. 1 illustrates an example of the smartphone cover according to the embodiment. A smartphone cover 100 is a case to be attached to a smartphone, which is substantially shaped like a rectangular solid (plate), and protects the smartphone. The smartphone cover 100 includes a bottom part 101 and wall parts 102 and 103 erected from the edges of the bottom part 101. Hereinafter, a direction from the bottom part 101 to the opening of a storage space 110 is referred to as an upward direction while a direction opposite to the upward direction is referred to as a downward direction.

The bottom part 101 is a member that covers the bottom of the smartphone to be protected by the smartphone cover 100 and comes into contact with the bottom of the smartphone. The bottom part 101 is a substantially rectangular plate formed according to the bottom of the smartphone to be protected by the smartphone cover 100.

The wall parts 102 and 103 are members that surround the sides of the smartphone to be protected by the smartphone cover 100 and come into contact with the sides of the smartphone. The wall parts 102 and 103 are provided so as to be erected from the edges of the bottom part 101. The wall parts 102 are provided so as to be erected from the short sides of the substantially rectangular bottom part 101. The wall parts 103 are provided so as to be erected from the long sides of the substantially rectangular bottom part 101. In other words, the wall parts 102 are shorter than the wall parts 103.

The bottom part 101 and the wall parts 102 and 103 are made of a dielectric. The dielectric that forms the bottom part 101 and the wall parts 102 and 103 preferably has a relative dielectric constant of 1 to 10. Such a dielectric may be, for example, ABS resin, polycarbonate resin, silicone rubber, or thermoplastic polyurethane elastomer.

The bottom part 101 and the wall parts 102 and 103 form the storage space 110 for storing the smartphone to be protected. The storage space 110 is formed into a shape substantially identical to the outside shape of the smartphone to be stored. The smartphone cover 100 protects the smartphone, which is stored (fit) in the storage space 110, from an external impact or the like.

On the bottom part 101 and the wall parts 102 and 103, a plurality of conductive elements 120 is placed in line. The conductive elements 120 are, for example, metallic conductors worked into plates. The conductive elements 120 may be provided next to the storage space 110 on the surfaces (inner surfaces) of the bottom part 101 and the wall parts 102 and 103. The conductive elements 120 may be provided on the opposite surfaces (outer surfaces) of the bottom part 101 and the wall parts 102 and 103 from the storage space 110. Alternatively, the conductive elements 120 may be provided inside the bottom part 101 and the wall parts 102 and 103.

The size of the conductive element 120 is determined according to the wavelengths of radio waves used for radio communications with the smartphone to be stored in the smartphone cover 100 and the dielectric constant of the dielectric that forms the smartphone cover 100. The conductive element 120 is, for example, a polygonal plate with a diagonal line measuring $0.1\,\lambda_g$ to $0.4\,\lambda_g$ or a disk with a diameter of $0.1\,\lambda_g$ to $0.4\,\lambda_g$ where $\lambda_g$ is the effective wavelength of radio waves of the smartphone in the dielectric that forms the smartphone cover 100. Moreover, the adjacent conductive elements 120 are preferably spaced with a pitch of $0.5\,\lambda_g$.

For example, when the smartphone to be protected by the smartphone cover 100 performs radio communications using the radio waves of a millimeter waveband (a frequency of 24 to 300 GHz), the effective wavelength $\lambda_g$ in the smartphone cover 100 selected from materials having relative dielectric constants of 1 to 10 can be determined by the following Formula (1).

[Math. 1]

$$\lambda_g = \frac{c}{f} \times \frac{1}{\sqrt{\varepsilon_r}} \qquad \text{Formula (1)}$$

Formula (1)

In Formula (1), c is a speed of light, f is a frequency, and $\varepsilon_r$ is a relative dielectric constant. According to Formula (1), the effective wavelength $\lambda_g$ is 0.32 mm to 12.5 mm. Thus, in radio communications by the smartphone using the millimeter radio waves, the conductive element 120 can be, for example, a polygonal plate with a diagonal line measuring 0.032 to 5 mm or a disk with a diameter of 0.032 to 5 mm. Moreover, the adjacent conductive elements 120 are preferably spaced with a pitch of 0.16 to 6.25 mm.

Figure 2:
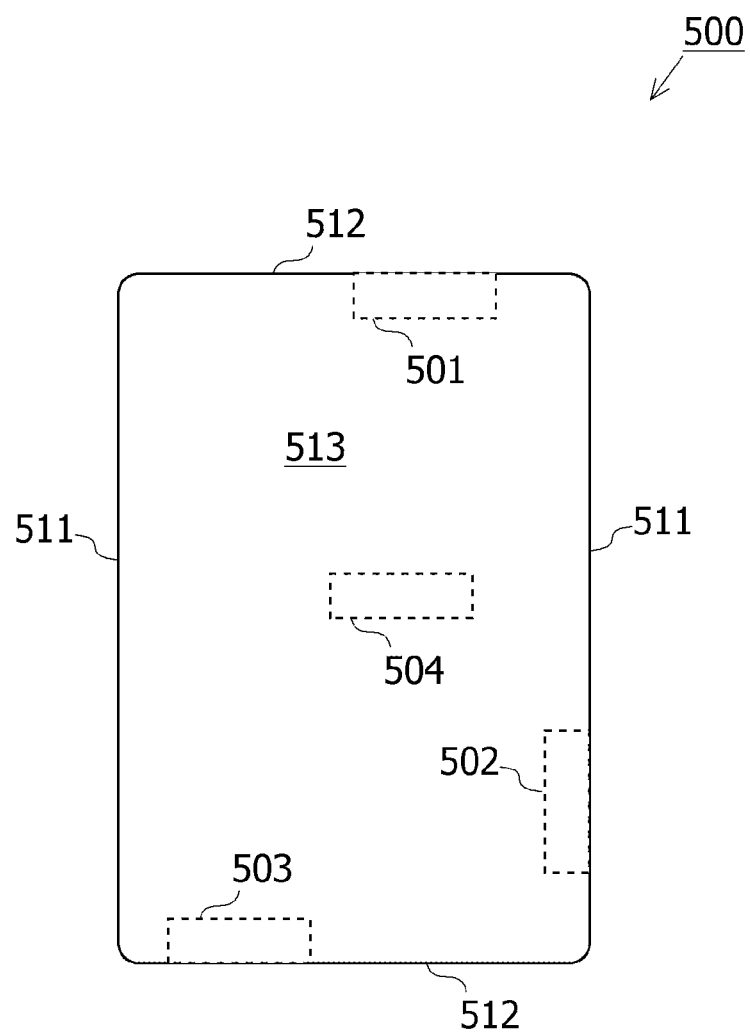
FIG. 2 illustrates an example of a front view of a smartphone to be protected by the smartphone cover according to the embodiment.

FIG. 2 illustrates an example of a front view of the smartphone to be protected by the smartphone cover according to the embodiment. A smartphone 500 to be protected can be a smartphone to be stored in the smartphone cover 100. In FIG. 2, the positions of antennas mounted on the smartphone 500 are indicated by dotted lines. The smartphone 500 is formed into a rectangular plate in overall view. The smartphone 500 includes four millimeter-wave antenna modules 501, 502, 503, and 504. The millimeter-wave antenna modules 501, 502, 503, and 504 are antennas for radio communications using millimeter radio waves. The millimeter-wave antenna modules 501, 502, 503, and 504 are four-element patch array antennas, each having four patch antennas. The millimeter-wave antenna modules 501 and 503 are provided to direct the transmission and reception of radio waves to sides 512 that form the short sides of the smartphone 500. The millimeter-wave antenna module 502 is provided to direct the transmission and reception of radio waves to sides 511 that form the long sides of the smartphone 500. The millimeter-wave antenna module 504 is provided to direct the transmission and reception of radio waves to the bottom of the smartphone 500.

Figure 3:
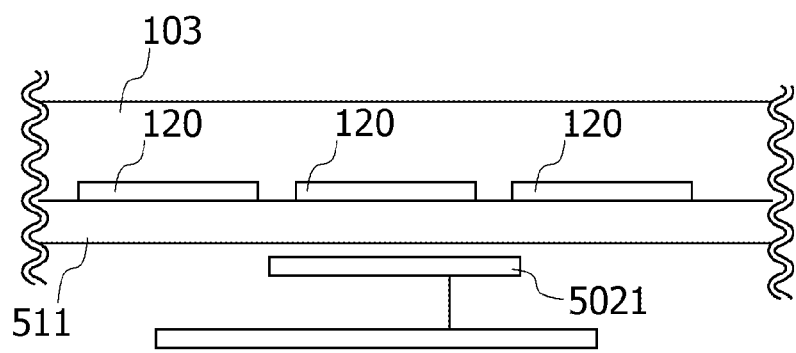
FIG. 3 schematically illustrates the positional relationship between the conductive elements of the smartphone cover and the antennas of the smartphone according to the embodiment.

FIG. 3 schematically illustrates the positional relationship between the conductive elements of the smartphone cover and the antennas of the smartphone according to the embodiment. On the bottom part 101 and the wall parts 102 and 103 of the smartphone cover 100, the conductive elements 120 are placed in line. Thus, when the smartphone 500 is stored in the storage space 110 of the smartphone cover 100, any one of the conductive elements 120 is placed near a direction that emits the radio waves of the millimeter-wave antenna modules 501, 502, 503, and 504 of the smartphone 500. FIG. 3 illustrates a state where the conductive elements 120 are placed in the direction of emission of a patch antenna 5021 of the millimeter-wave antenna module 502. The conductive elements 120 resonate with radio waves having the effective wavelength $\lambda_g$. Thus, as illustrated in FIG. 3, the conductive element 120 placed near the direction that emits the radio waves of the patch antenna 5021 operates as a resonator (so-called stacked patch). The conductive element 120 operating as a stacked patch allows the smartphone cover 100 to improve the actual gains of the millimeter-wave antenna modules 501, 502, 503, and 504 of the stored smartphone 500.

Simulation

The effects of the smartphone cover 100 were examined by simulation as will be described below.

First Simulation

In the first simulation, actual gains were examined while changing the length of a side of each stacked patch 1004 and a distance between the patch antenna 1003 and the stacked patch 1004.

Figure 4:
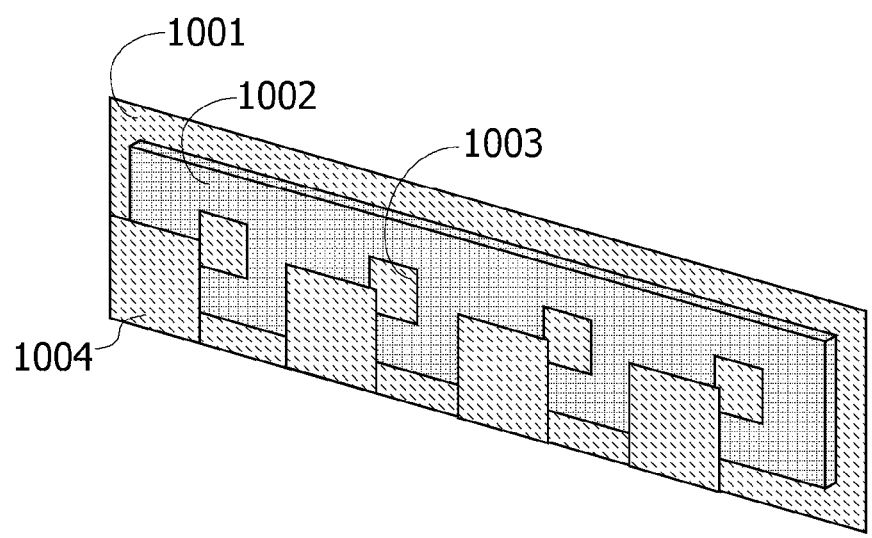
FIG. 4 illustrates an example of a first model used in a first simulation.

FIG. 4 illustrates an example of a first model used in the first simulation. In the first model illustrated in FIG. 4, a substrate 1002 with a relative dielectric constant of 12 is provided on a ground 1001. On the substrate 1002, four square patch antennas 1003 are placed in line. The square stacked patches 1004 are placed in the directions of emission of the four patch antennas 1003, respectively.

Figure 5:
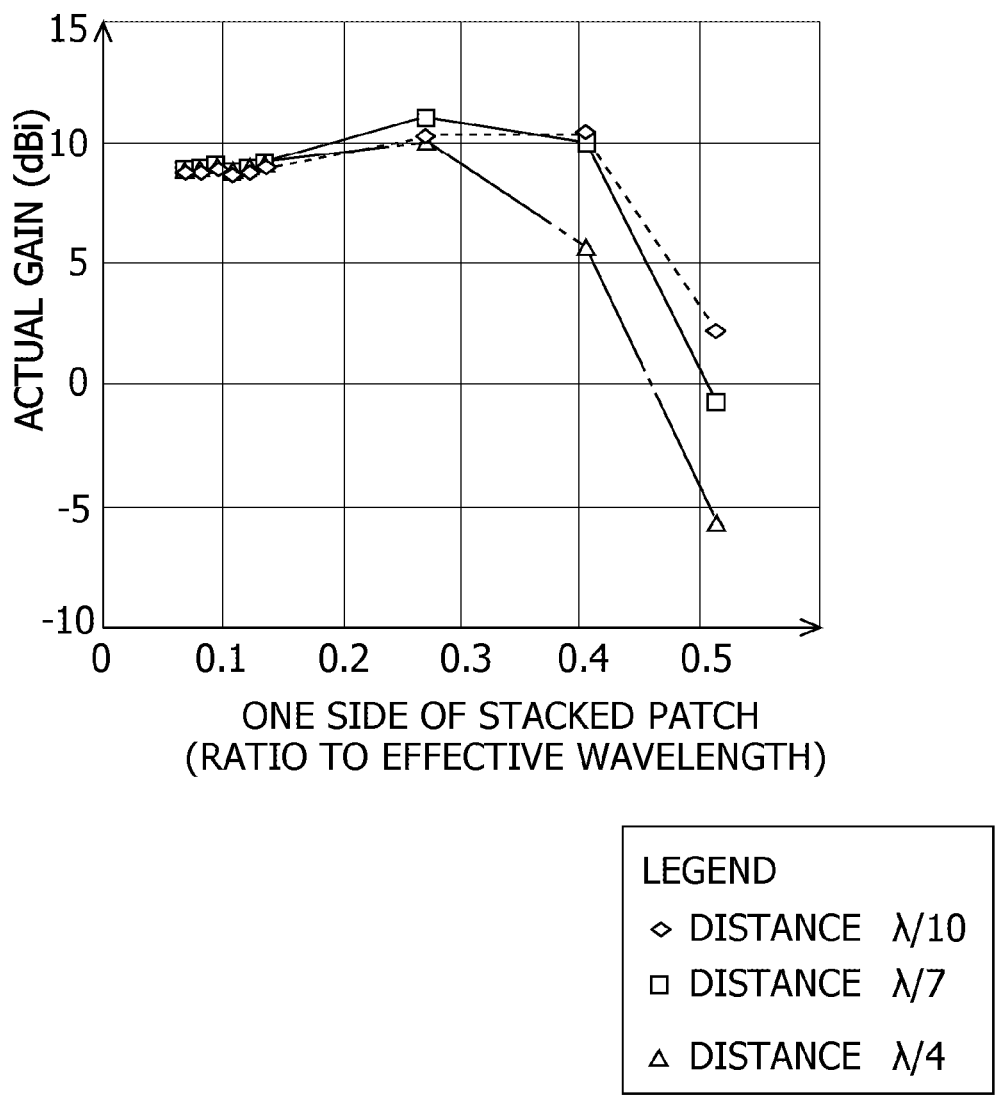
FIG. 5 illustrates the simulation results of the first simulation.

FIG. 5 illustrates the simulation results of the first simulation. The vertical axis of FIG. 5 indicates an actual gain (dBi) while the horizontal axis of FIG. 5 indicates the length of one side of the stacked patch 1004. Referring to FIG. 5, it is understood that an actual gain is more greatly affected by the length of one side of the stacked patch 1004 than a distance between the patch antenna 1003 and the stacked patch 1004. Furthermore, it is understood that an actual gain is effectively improved when the length of one side of the stacked patch 1004 is 0.1 $\lambda_g$ to 0.4 $\lambda_g$. In the case of an effective wavelength of 0.32 mm, 0.1 $\lambda_g$ is 0.032 mm while 0.4 $\lambda_g$ is 0.0128 mm. In the case of an effective wavelength of 12.5 mm, 0.1 $\lambda_g$ is 1.25 mm while 0.4 $\lambda_g$ is 5 mm.

Second Simulation

In the second simulation, the presence or absence of an effect with the stacked patch and the patch antenna displaced from each other in front view was examined. Moreover, in the second simulation, the presence or absence of an effect with an increased number of stacked patches was examined. In the second simulation, an effective wavelength $\lambda_g$ was 11.1 mm while the stacked patches 1004 are spaced with a pitch of 0.51 $\lambda_g$.

Figure 6:
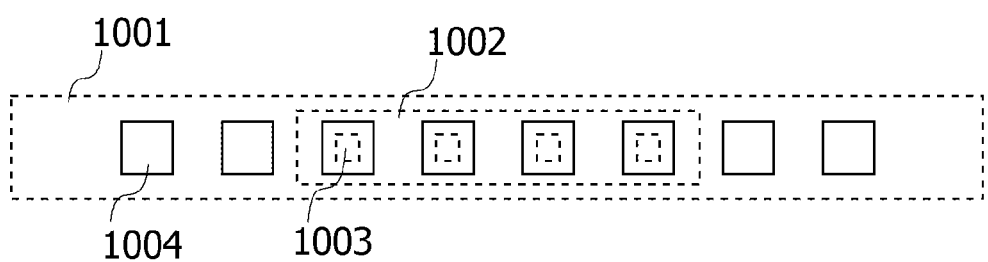
FIG. 6 is a first diagram illustrating an example of a model used in a second simulation.

FIGS. 6 to 9 exemplify models used in the second simulation. FIG. 6 illustrates a 2-1 model. The 2-1 model includes the stacked patches 1004 disposed at the fronts of the patch antennas 1003. In the 2-1 model, the patch antennas 1003 and the stacked patches 1004 disposed at the fronts of the patch antennas 1003 are centered at the same position in front view.

Figure 7:
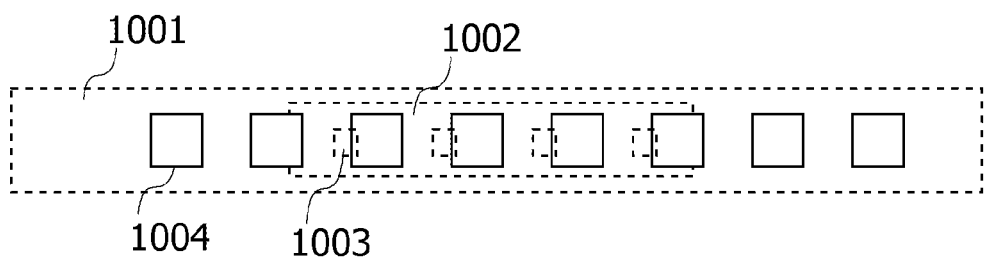
FIG. 7 is a second diagram illustrating an example of a model used in the second simulation.

FIG. 7 illustrates a 2-2 model. In the 2-2 model, the stacked patches 1004 are moved from those of the 2-1 model to the right by 0.17 $\lambda_g$ (about 1.7 mm) in FIG. 7. Thus, in the 2-2 model, the left sides of the patch antennas 1003 are partially viewed between the stacked patches 1004 in front view.

Figure 8:
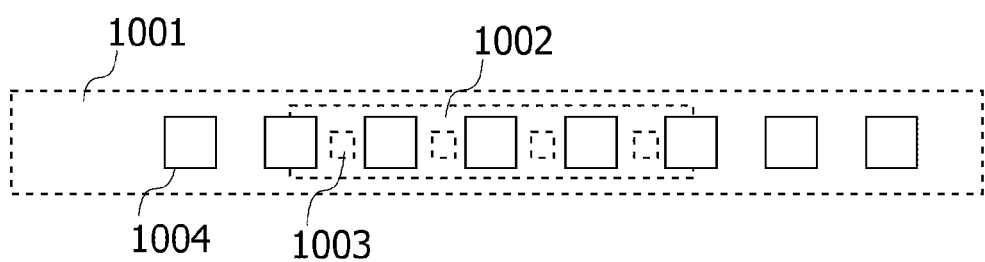
FIG. 8 is a third diagram illustrating an example of a model used in the second simulation.

FIG. 8 illustrates a 2-3 model. In the 2-3 model, the stacked patches 1004 are moved from those of the 2-1 model to the right by 0.256 $\lambda_g$ (about 2.85 mm) in FIG. 8. Thus, in the 2-3 model, the patch antennas 1003 are viewed between the stacked patches 1004 in front view.

Figure 9:
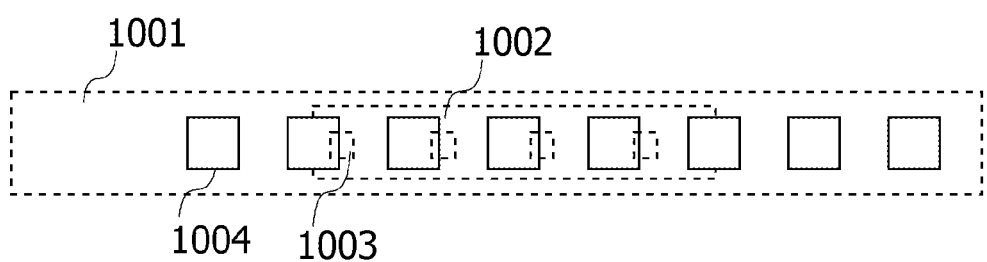
FIG. 9 is a fourth diagram illustrating an example of a model used in the second simulation.

FIG. 9 illustrates a 2-4 model. In the 2-4 model, the stacked patches 1004 are moved from those of the 2-1 model to the right by 0.34 $\lambda_g$ (about 3.8 mm) in FIG. 9. Thus, in the 2-4 model, the right sides of the patch antennas 1003 are partially viewed between the stacked patches 1004 in front view.

Examination of Beam Forming

Figure 10:
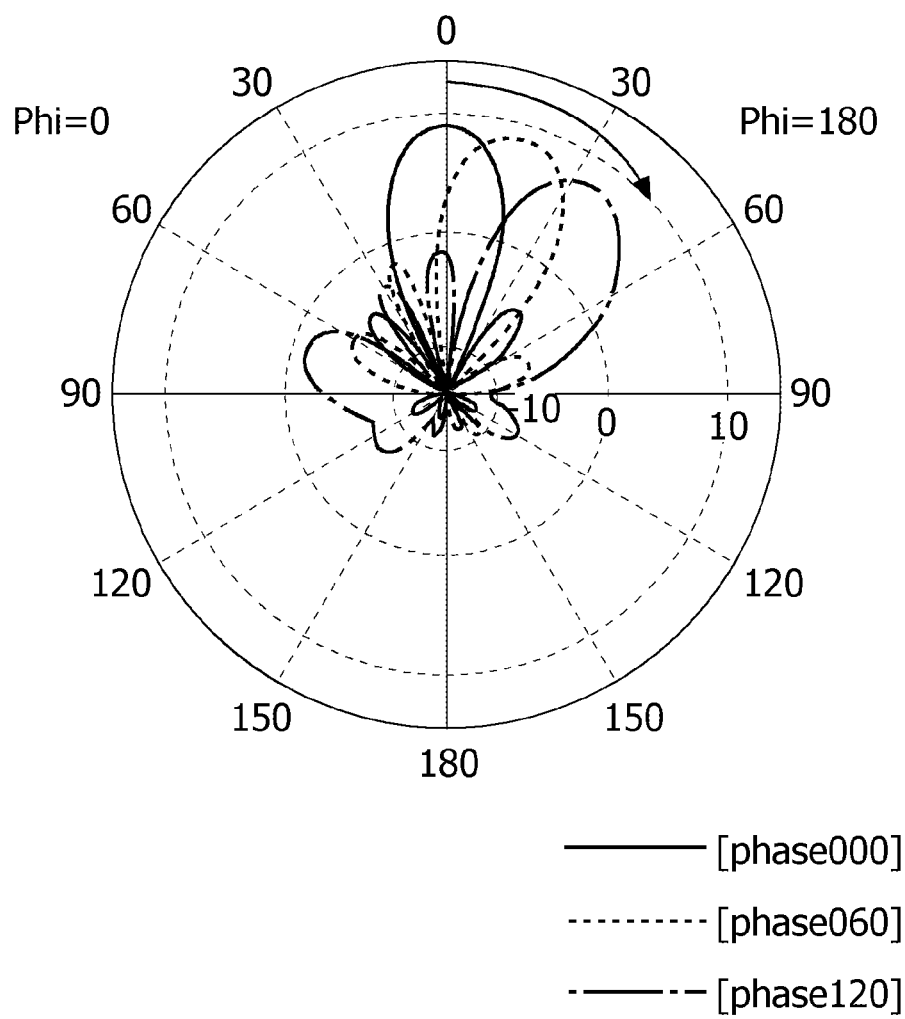
FIG. 10 is a first diagram illustrating the simulation results of examination of beam forming.
Figure 11:
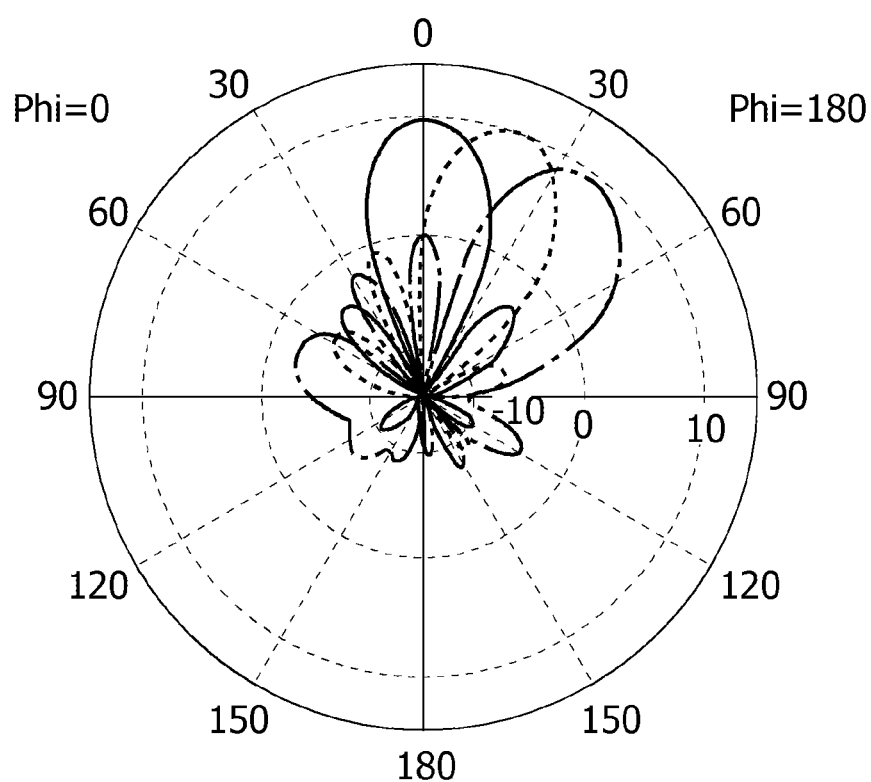
FIG. 11 is a second diagram illustrating the simulation results of examination of beam forming.
Figure 12:
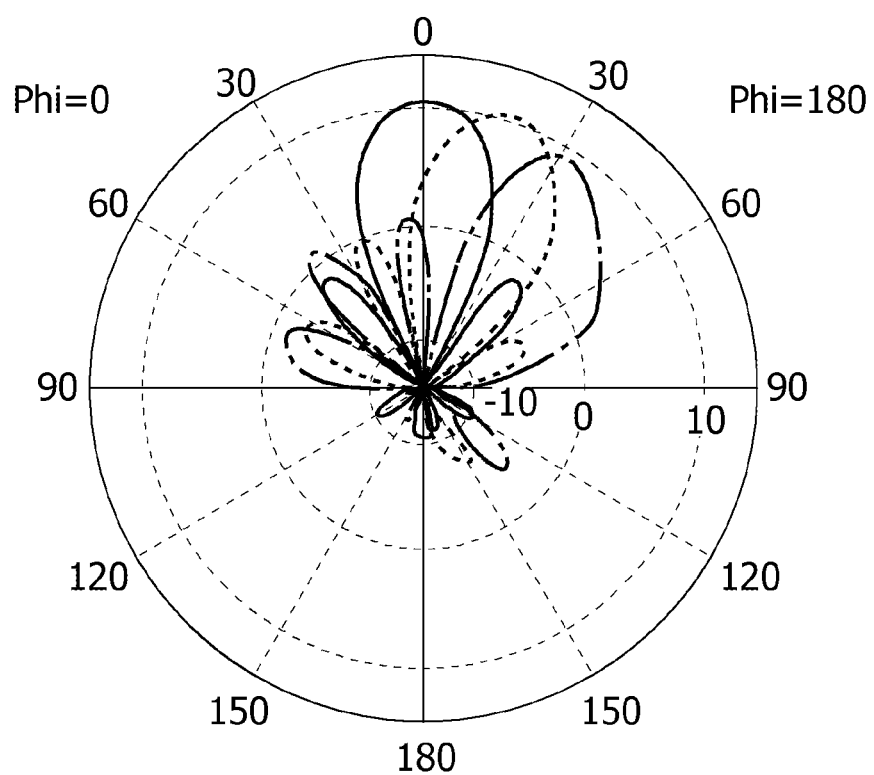
FIG. 12 is a third diagram illustrating the simulation results of examination of beam forming.
Figure 13:
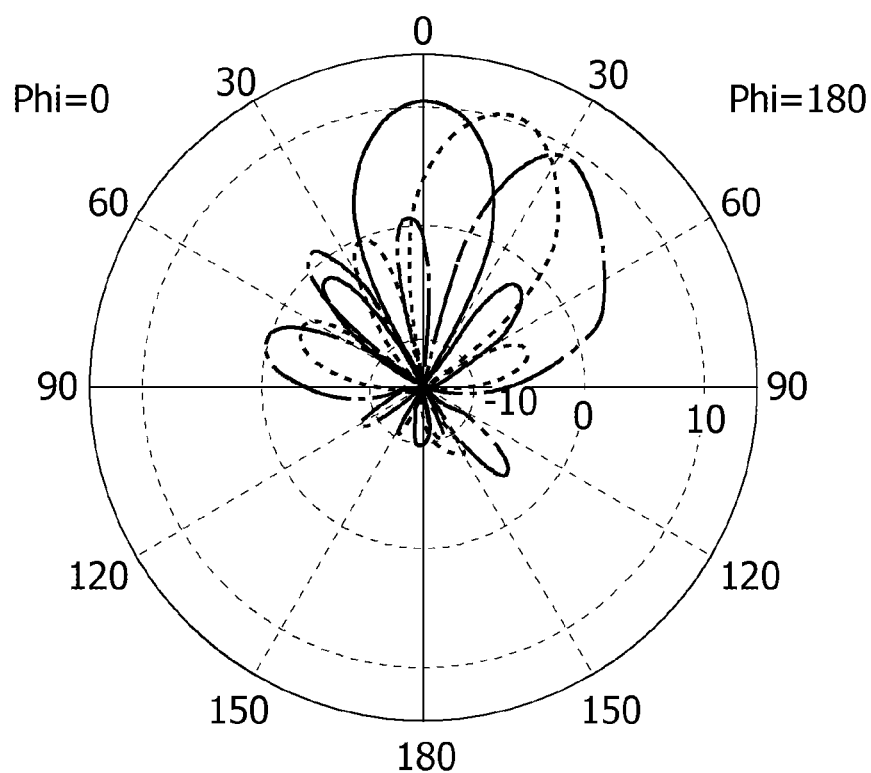
FIG. 13 is a fourth diagram illustrating the simulation results of examination of beam forming.
Figure 14:
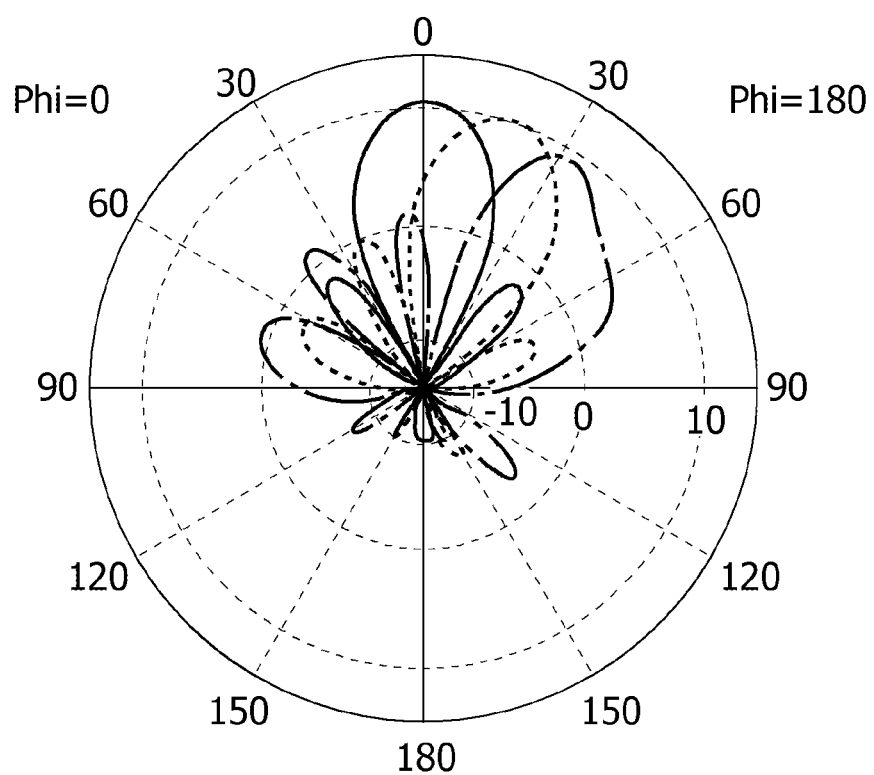
FIG. 14 is a fifth diagram illustrating the simulation results of examination of beam forming.
Figure 15:
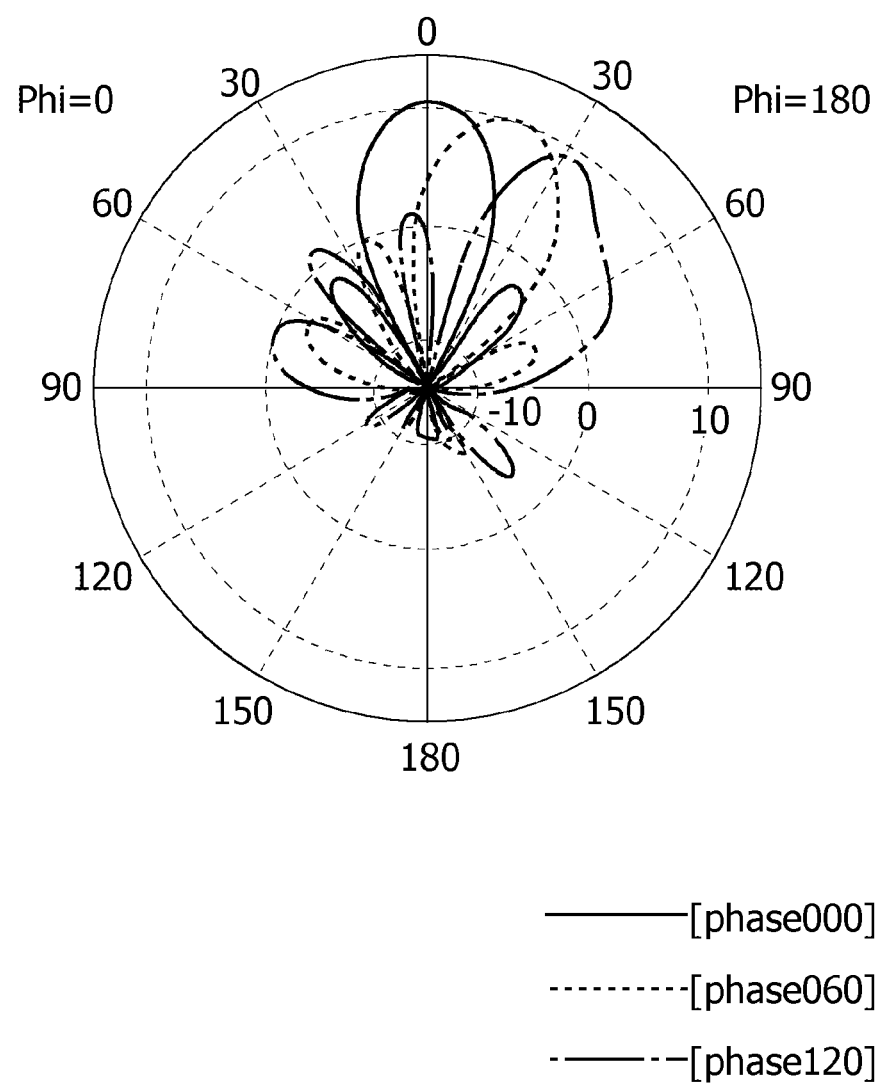
FIG. 15 is a sixth diagram illustrating the simulation results of examination of beam forming.

FIGS. 10 to 15 illustrate the simulation results of examination of beam forming. FIG. 10 illustrates the simulation results of beam forming in the absence of the stacked patches 1004, that is, when the smartphone 500 is not stored in the smartphone cover 100. FIG. 11 illustrates the simulation results of beam forming for the first model. FIG. 12 illustrates the simulation results of beam forming for the 2-1 model. FIG. 13 illustrates the simulation results of beam forming for the 2-2 model. FIG. 14 illustrates the simulation results of beam forming for the 2-3 model. FIG. 15 illustrates the simulation results of beam forming for the 2-4 model.

Referring to FIG. 11, it is understood that the first model, that is, the provision of the four stacked patches 1004 is likely to improve an actual gain by about 2 dB. Referring to FIG. 11, it is understood that beam forming can be performed in the provision of the four stacked patches 1004. Referring to FIGS. 12 to 15, it is understood that beam forming can be performed in the provision of the five or more stacked patches 1004. Referring to FIGS. 12 to 15, it is understood that a lateral displacement between the patch antennas 1003 and the stacked patches 1004 hardly affects an actual gain. For these reasons, it is assumed that the multiple conductive elements 120 disposed on the smartphone cover 100 improve the actual gain of the smartphone 500.

Third Simulation

In the second simulation, a lateral displacement between the patch antennas 1003 and the stacked patches 1004 was examined, whereas in a third simulation, longitudinal and lateral displacements between the patch antennas 1003 and the stacked patches 1004 will be also examined.

Figure 16:
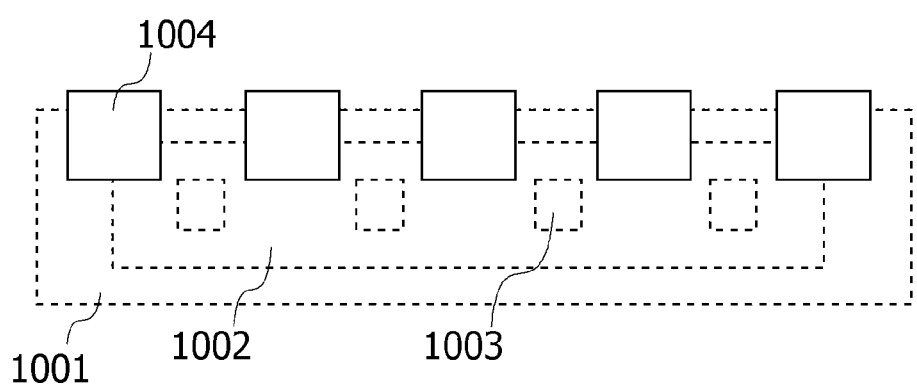
FIG. 16 illustrates an example of a third model used in a third simulation.

FIG. 16 illustrates an example of a third model used in the third simulation. In the third model, the patch antennas 1003 are spaced with a pitch of 5.7 mm. The stacked patches 1004 are spaced with a pitch of 5.7 mm. A shift amount H in the longitudinal direction is a vertical difference between the center of the patch antenna 1003 and the center of the stacked patch 1004. In FIG. 16, when the stacked patches 1004 are located above the patch antennas 1003, the shift amount has a positive value, whereas when the stacked patches 1004 are located below the patch antennas 1003, the shift amount has a negative value. A shift amount W in the lateral direction is a horizontal difference between the center of the patch antenna 1003 and the center of the stacked patch 1004. In FIG. 16, when the stacked patches 1004 are located on the right sides of the patch antennas 1003, the shift amount has a positive value, whereas when the stacked patches 1004 are located on the left sides of the patch antennas 1003, the shift amount has a negative value.

FIG. 17 illustrates the simulation results of the third simulation. FIG. 17 indicates shift amounts (mm) in the longitudinal direction and the lateral direction and actual gains (dBi), the shift amounts being associated with the actual gains. In FIG. 17, a shift amount of 0 mm in the longitudinal direction and a shift amount of 0 mm in the lateral direction indicate that the center of the patch antenna 1003 and the center of the stacked patch 1004 are aligned with each other in front view. As a reference value, the patch antenna 1003 has an actual gain of 8.8 dBi in the absence of the stacked patches 1004.

Referring to FIG. 17, when a shift amount in the longitudinal direction is +1.46 mm to −1.46 mm, the actual gain can be 10 dBi while a shift amount in the lateral direction is −3.8 mm to +3.8 mm. Referring to FIG. 17, the actual gain of the patch antenna 1003 in the presence of the stacked patches 1004 can be higher than 8.8 dBi, the actual gain of the patch antenna 1003 in the absence of the stacked patches 1004 with any shift amounts in the longitudinal and lateral directions within the range of examinations by simulation.

Fourth Simulation

Figure 18:
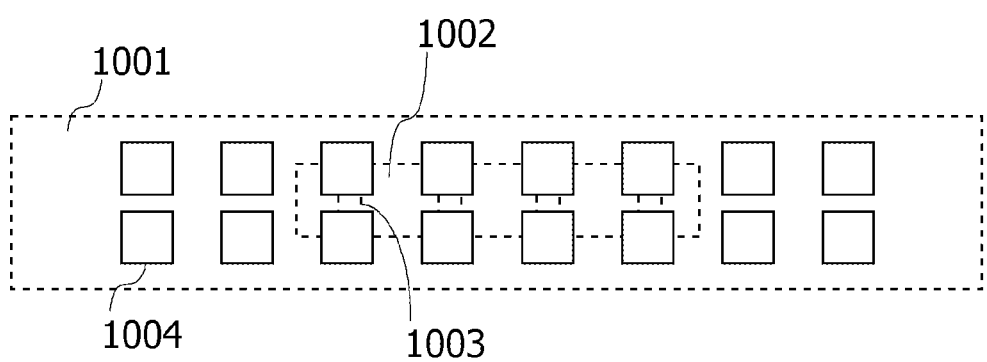
FIG. 18 is a first diagram illustrating an example of a model used in a fourth simulation.
Figure 19:
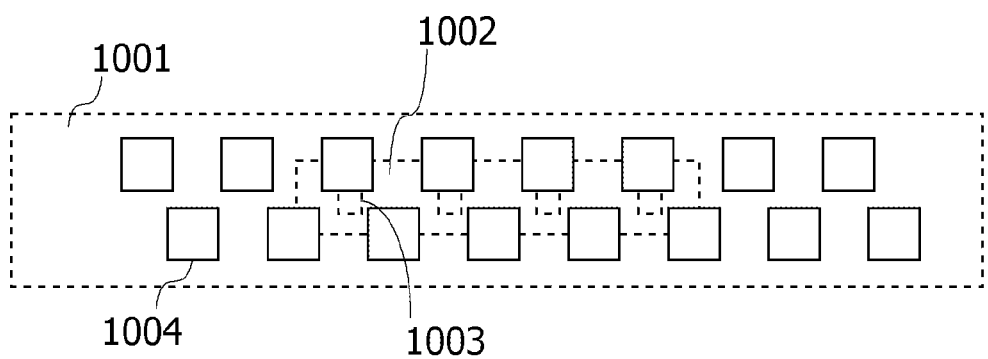
FIG. 19 is a second diagram illustrating an example of a model used in the fourth simulation.

In the fourth simulation, the stacked patches 1004 disposed in two rows in the vertical direction will be examined by simulation. FIGS. 18 and 19 exemplify models used in the fourth simulation. FIG. 18 illustrates a 4-1 model in which the center positions of the stacked patches 1004 disposed in two rows in the vertical direction are not laterally shifted. FIG. 19 illustrates a 4-2 model in which the center positions of the stacked patches 1004 disposed in two rows in the vertical direction are to be laterally shifted. The 4-2 model is also referred to as a staggered arrangement. In both of the model 4-1 and the model 4-2, the stacked patches 1004 in two rows in the vertical direction are spaced with a pitch of 0.55 mm (0.05 $\lambda_g$).

Figure 20:
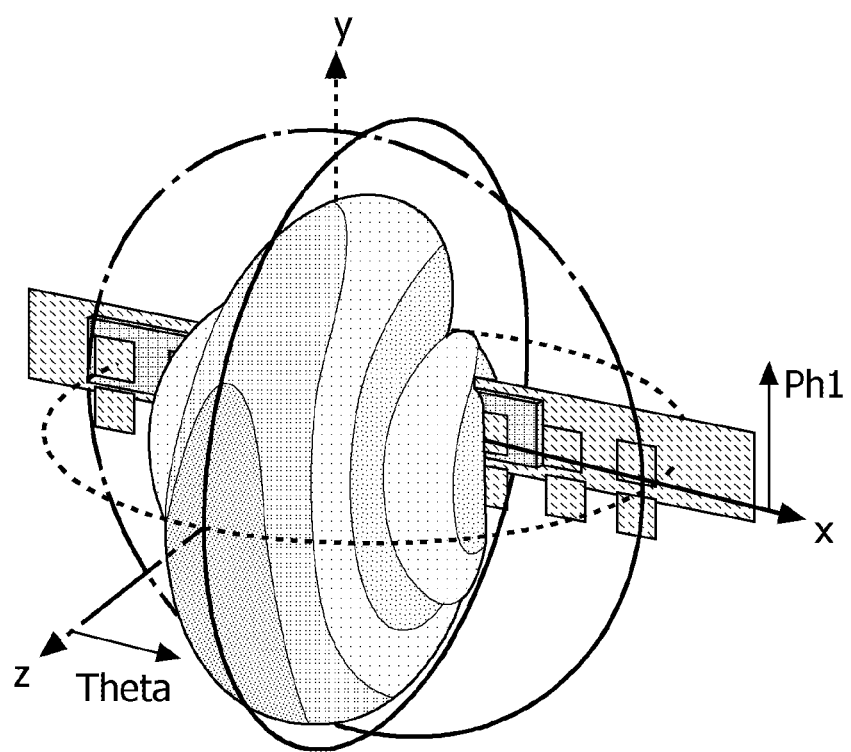
FIG. 20 is a first diagram illustrating the simulation results of the fourth simulation.
Figure 21:
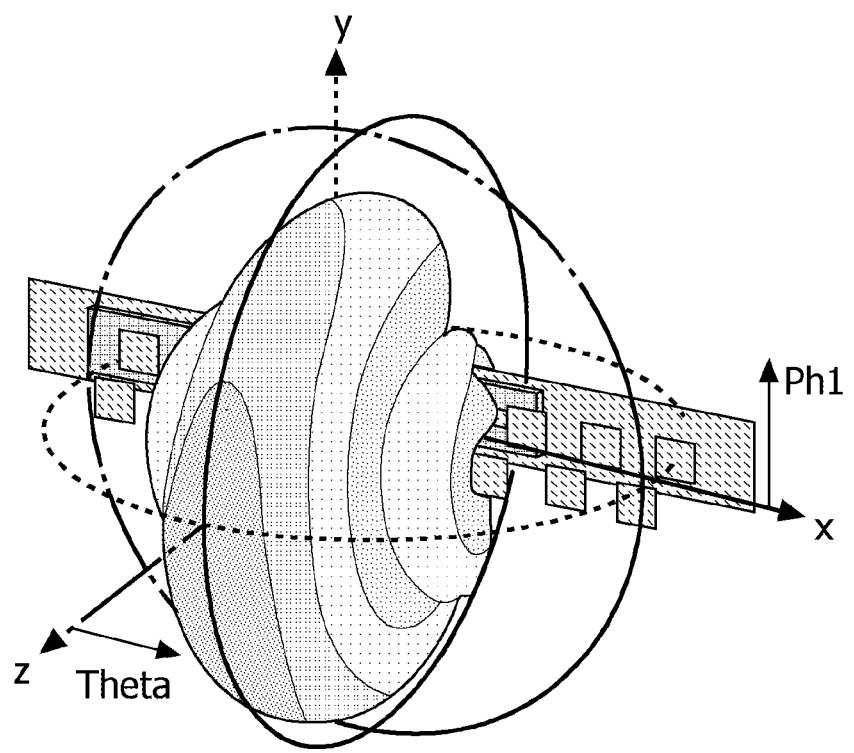
FIG. 21 is a second diagram illustrating the simulation results of the fourth simulation.

FIGS. 20 and 21 illustrate the simulation results of the fourth simulation. FIG. 20 illustrates the simulation results of the 4-1 model. FIG. 21 illustrates the simulation results of the 4-2 model. As a result of simulation of the 4-1 model, the patch antenna 1003 had an actual gain of 9.991 dBi. As a result of simulation of the 4-2 model, the patch antenna 1003 had an actual gain of 10.03 dBi.

The actual gains of the 4-1 model and the 4-2 model are lower than those of the models examined by the second simulation. However, the positions of millimeter-wave antenna modules in smartphones vary among manufacturers and products. Hence, it seems effective to immediately suppress a displacement between the conductive elements 120 and the patch antennas of the smartphone by placing the conductive elements 120 in two rows in the vertical direction on, for example, the wall parts 102 and 103 of the smartphone cover 100, though the actual gain may decrease to a certain extent.

Fifth Simulation

Figure 22:
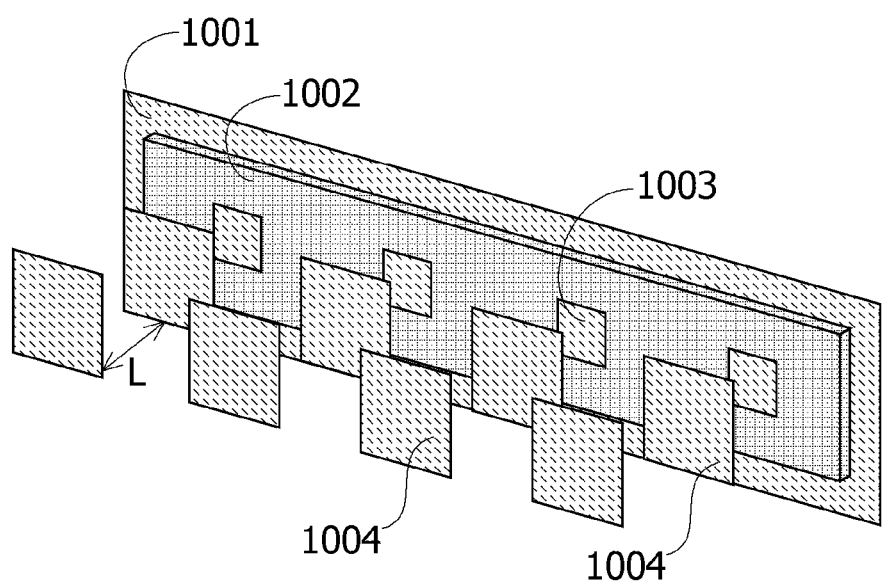
FIG. 22 illustrates an example of a fifth model used in a fifth simulation.

The fifth simulation simulated a model in which the stacked patches 1004 are stacked in two rows in the direction of the normal to the patch antennas 1003. FIG. 22 illustrates an example of a fifth model used in the fifth simulation. In the fifth model, the stacked patches 1004 were also disposed at a distance L in the direction of the normal to the patch antennas 1003 unlike in the first model. In the fifth simulation, a simulation was conducted while changing the distance L between the stacked patches 1004 that are stacked in two rows.

Figure 23:
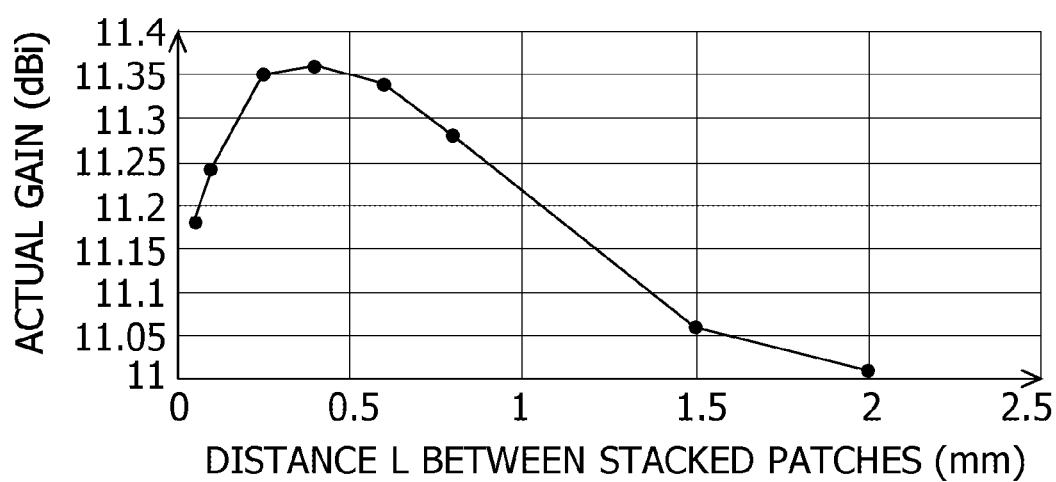
FIG. 23 indicates the simulation results of the fifth simulation.

FIG. 23 indicates the simulation results of the fifth simulation. In FIG. 23, the simulation was conducted on the assumption that the patch antennas 1003 emit radio waves at 27 GHz. Referring to FIG. 23, it is understood that the actual gain is maximized when the distance L between the stacked patches 1004 is 0.4 mm. In the first model in which the stacked patches 1004 are not stacked in rows, the actual gain is 11.05 dBi. Thus, it is understood that the stacked patches 1004 in rows are not expected to improve the actual gain when the distance L is 1.5 mm or more. In this case, the distance of 1.5 mm is 0.135 times the wavelength of radio waves at 27 GHz. In other words, it is assumed that the upper limit of the distance L is 0.135 times the wavelength of radio waves.

As described above, the maximum value of the effective wavelength $\lambda_g$ in a millimeter waveband is 12.5 mm. When $\lambda_g$ is 12.5 mm, the actual gain is expected to be increased by setting the distance L at 1.7 mm or less, which is 0.135 times as long as 12.5 mm.

The Effects of the Embodiment

The smartphone stored in the smartphone cover made of a dielectric may decrease in actual gain. Such a problem often occurs in 5G smartphones that use millimeter radio waves.

In the present embodiment, the conductive elements 120 are disposed on the smartphone cover 100 and are operated as stacked patches, thereby suppressing a reduction in the actual gain of the smartphone stored in the smartphone cover.

In the present embodiment, the shapes of the conductive elements 120 are optimized for millimeter radio waves. In other words, one side of the square conductive element 120 is set at 0.1 $\lambda_g$ to 0.4 $\lambda_g$ (0.032 mm to 5 mm), so that the conductive elements 120 can be operated as resonators suitable for millimeter radio waves. Hence, according to the present embodiment, the smartphone stored in the smartphone cover 100 is expected to improve in actual gain.

In the present embodiment, a distance between the conductive elements 120 is optimized for the radio waves of a millimeter waveband. In other words, a pitch between the rectangular conductive elements 120 is set at 0.5 $\lambda_g$ (0.16 mm to 6.25 mm), so that the conductive elements 120 can be operated as resonators suitable for millimeter radio waves even if a displacement occurs between the conductive elements 120 and the patch antennas provided in the millimeter-wave antenna modules 501, 502, 503, and 504 of the smartphone 500.

In the present embodiment, as illustrated in the fifth simulation, the conductive elements 120 may be arranged in the thickness direction of the wall parts 102 and 103 and the bottom part 101. A distance between the conductive elements 120 in the thickness direction is set at 0.135 (1.7 mm) or less, so that the smartphone is expected to improve in actual gain.

In the present embodiment, the conductive elements 120 are disposed over the wall parts 102 and 103 and the bottom part 101. Since the conductive elements 120 are arranged thus, any one of the conductive elements 120 is located near the patch antennas of the millimeter antenna modules even if the positions of the millimeter antenna modules in the smartphone are not identified. Hence, according to the present embodiment, the smartphone is expected to improve in actual gain even if the positions of the millimeter antenna modules in the smartphone are not identified.

Modification

Figure 24:
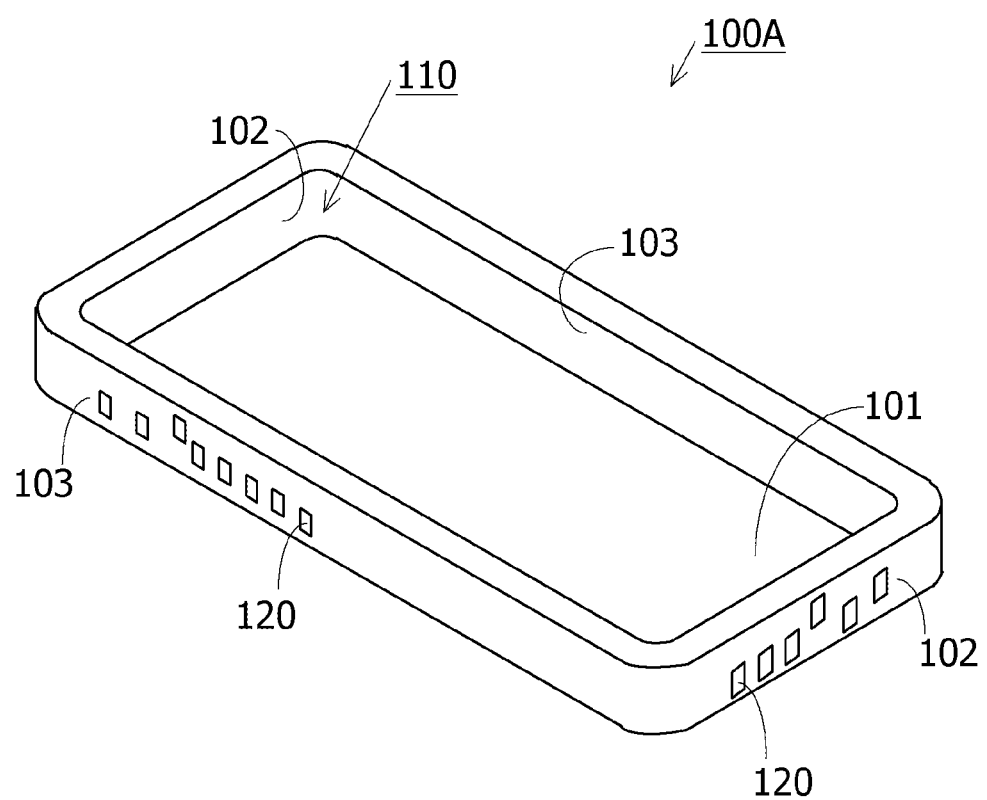
FIG. 24 illustrates an example of a smartphone cover according to a first modification.
Figure 25:
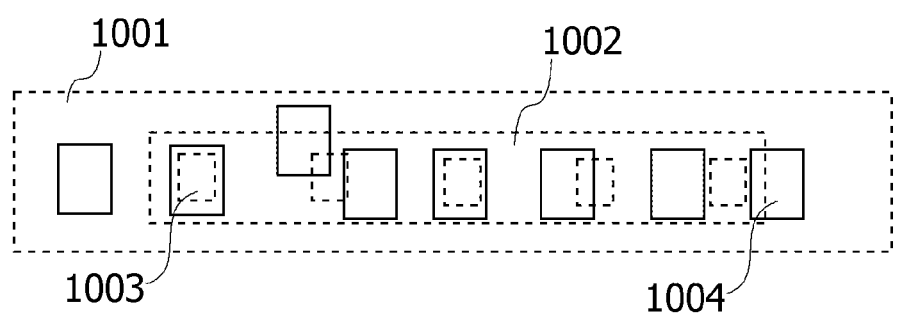
FIG. 25 is a first diagram illustrating a variation in the positional relationship between conductive elements and patch antennas according to the first modification.
Figure 26:
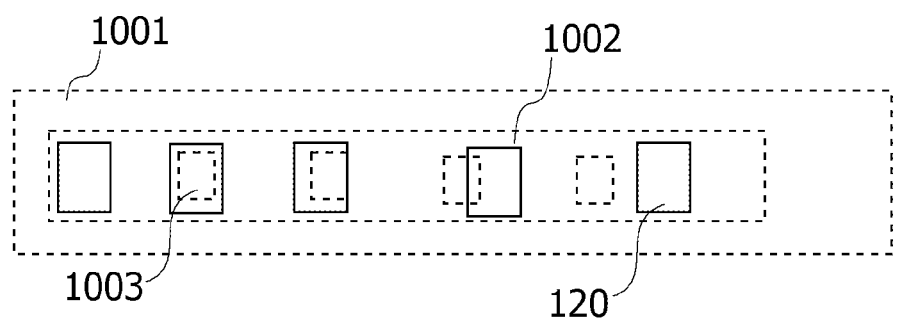
FIG. 26 is a second diagram illustrating a variation in the positional relationship between the conductive elements and the patch antennas according to the first modification.
Figure 27:
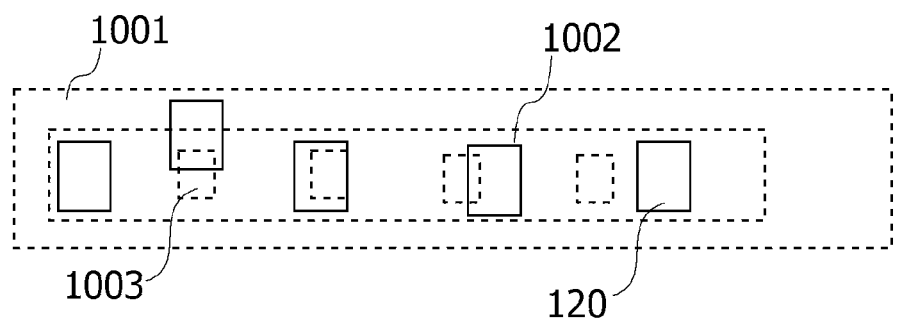
FIG. 27 is a third diagram illustrating a variation in the positional relationship between the conductive elements and the patch antennas according to the first modification.
Figure 28:
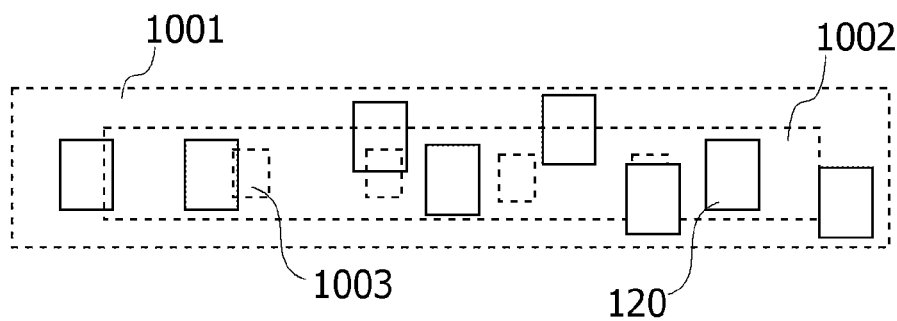
FIG. 28 is a fourth diagram illustrating a variation in the positional relationship between the conductive elements and the patch antennas according to the first modification.

FIG. 24 illustrates an example of the smartphone cover according to a first modification. In the embodiment, the conductive elements 120 are spaced with a pitch of 0.5 $\lambda_g$ (0.16 to 6.25 mm). The conductive elements 120 are not always spaced at regular intervals. As illustrated in FIG. 24, the conductive elements 120 may be spaced at irregular intervals within the pitch (0.16 to 6.25 mm). From among the conductive elements 120 spaced at irregular intervals, a set of the conductive elements 120 spaced with a first pitch is an example of "a set of conductive elements spaced with a first pitch." From among the conductive elements 120 spaced at irregular intervals, a set of the conductive elements 120 spaced with a second pitch is an example of "a set of conductive elements spaced with a second pitch." The first pitch and the second pitch are preferably selected within the range of 0.5 $\lambda_g$ (0.16 to 6.25 mm). Without being disposed over a smartphone cover 100A, the conductive elements 120 may be disposed at, for example, positions where millimeter antenna modules are likely to be located in a smartphone to be protected. Specifically, as illustrated in FIG. 24, the conductive elements 120 may be disposed in some regions of the smartphone cover 100A.

FIGS. 25 to 28 illustrate variations in the positional relationship between the conductive elements and patch antennas according to the first modification. On the smartphone cover 100A, the conductive elements 120 are disposed at positions where the millimeter antenna modules are likely to be located. Thus, any one of the disposed conductive elements 120 is likely to be located at the front of or near the patch antenna provided in the millimeter antenna module. Hence, the first modification is also expected to improve the actual gain of the smartphone. The number of conductive elements 120 and the number of patch antennas 1003 may be equal to or different from each other.

Figure 29:
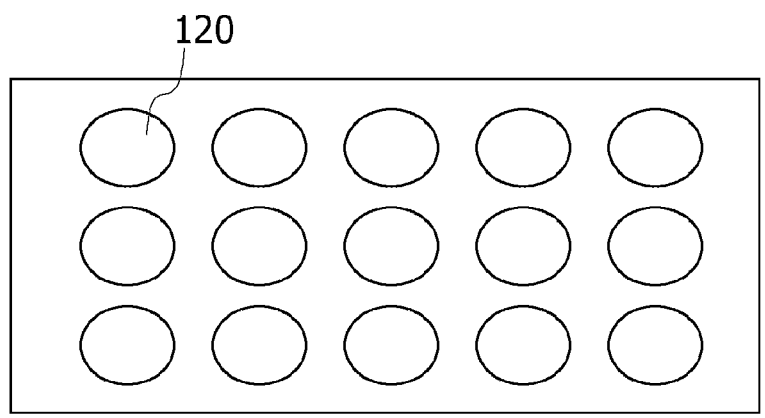
FIG. 29 is a first diagram illustrating the layout of the conductive elements in forms other than squares.
Figure 30:
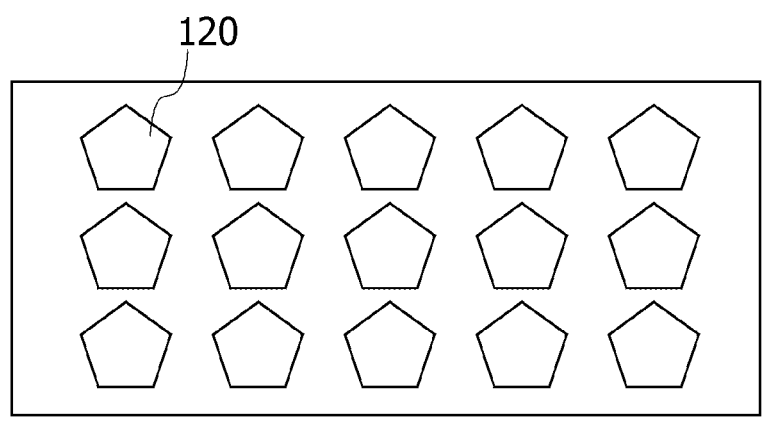
FIG. 30 is a second diagram illustrating the layout of the conductive elements in forms other than squares.
Figure 31:
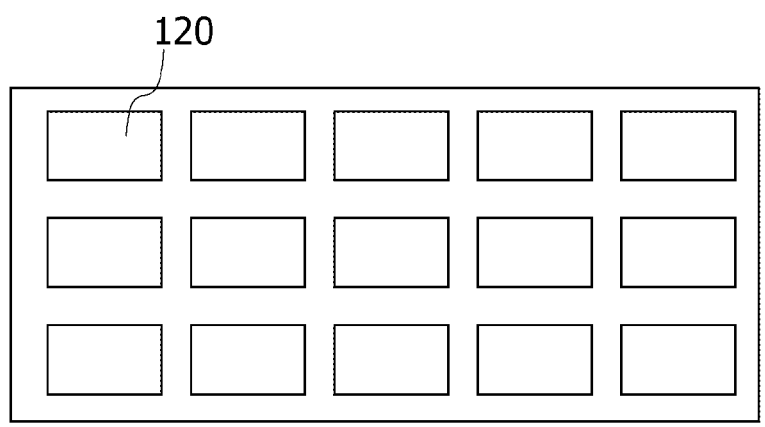
FIG. 31 is a third diagram illustrating the layout of the conductive elements in forms other than squares.

In the embodiment, the conductive elements 120 are shaped like squares. The shapes of the conductive elements 120 are not limited thereto. The conductive elements 120 may be shaped like circles or polygons other than squares. FIGS. 29 to 32 illustrate the layout of the conductive elements in forms other than squares. FIG. 29 illustrates the oval conductive elements 120. In the case of the oval conductive element 120, the major axis may measure 0.1 $\lambda_g$ to 0.4 $\lambda_g$ (0.032 to 5 mm). In the case of the round conductive element 120, the diameter may measure 0.1 $\lambda_g$ to 0.4 $\lambda_g$ (0.032 to 5 mm). FIG. 30 illustrates the pentagonal conductive elements 120. FIG. 31 illustrates the rectangular conductive elements 120. In the case of the polygonal conductive element 120 shaped like, for example, a rectangle, the longest line of one side or the diagonal lines of the conductive element may measure 0.1 $\lambda_g$ to 0.4 $\lambda_g$ (0.032 to 5 mm). In other words, the conductive elements 120 are shaped like plates that can vary in shape in front view. The conductive elements 120 in various forms may have the longest line (also referred to as the most extended line) measuring 0.1 $\lambda_g$ to 0.4 $\lambda_g$ (0.032 to 5 mm) from among lines, each being formed on the conductive element 120 and connecting any two points of the conductive element 120.

Figure 32:
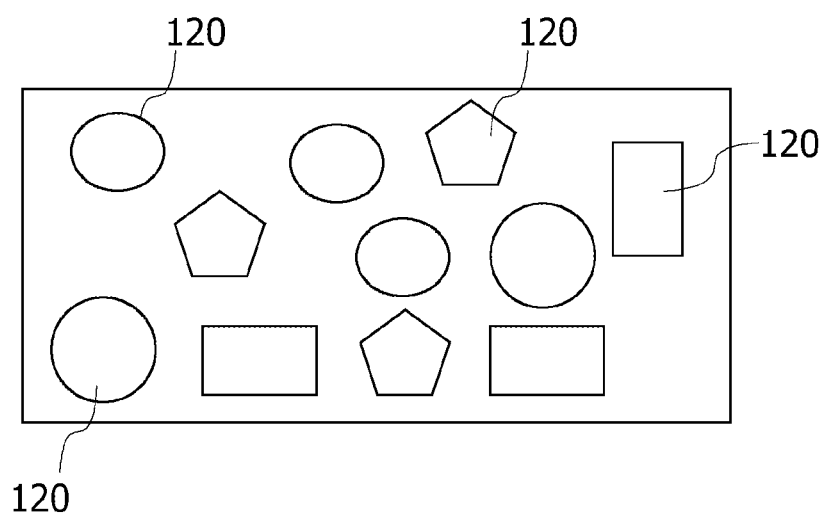
FIG. 32 is a fourth diagram illustrating the layout of the conductive elements in forms other than squares.

FIG. 32 illustrates the layout of the conductive elements in various forms. As illustrated in FIG. 32, the round or oval conductive elements 120 and the polygonal conductive elements 120 may be disposed in a mixed manner on the smartphone cover 100. In other words, the smartphone cover 100 may be provided with the conductive elements 120 in different shapes.

Figure 33:
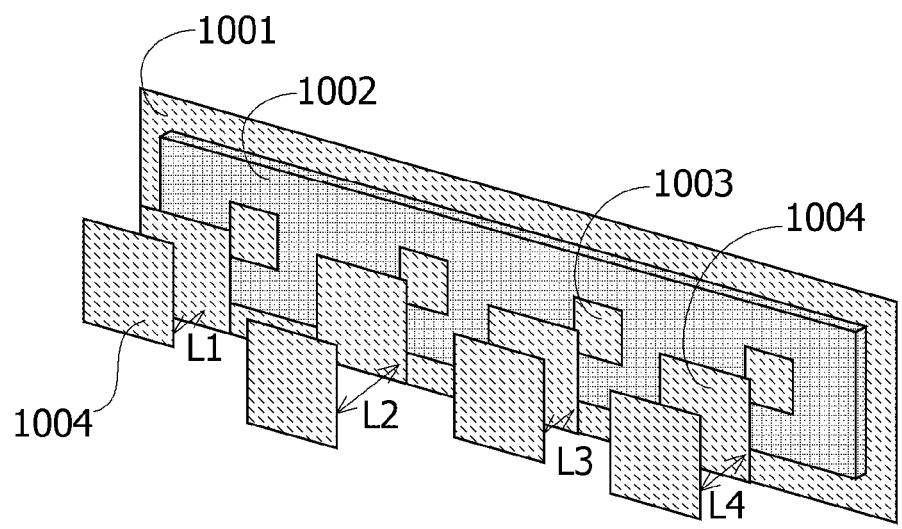
FIG. 33 illustrates a configuration in which distances are irregularly set between patch antennas and conductive elements.

In FIG. 22, the distance L between the stacked patches 1004 in two rows is kept constant at 1.7 mm or less, which is 0.135 times as long as 12.5 mm. The distance L may be irregularly set at 1.7 mm or less. FIG. 33 illustrates a configuration in which distances are irregularly set between patch antennas and conductive elements. FIG. 33 illustrates different distances including a distance L1, a distance L2, a distance L3, and a distance L4 between the stacked patches 1004. The distance L1, the distance L2, the distance L3, and the distance L4 are all set at 1.7 mm or less. In this way, even if distances between the stacked patches 1004 vary among pairs of stacked patches, the smartphone is expected to improve in actual gain while the distance between the stacked patches 1004 is kept at 1.7 mm or less.

The conductive elements 120 may be provided next to the storage space 110 on the surfaces of the wall parts 102 and 103 and the bottom part 101. In this case, the conductive elements 120 may be provided on the smartphone cover 100 by vacuum deposition, printing, or fitting or the like.

The conductive elements 120 may be embedded in a dielectric that forms the wall parts 102 and 103 and the bottom part 101. The conductive elements 120 provided thus can shorten the effective wavelengths of radio waves entering the conductive elements 120, so that the conductive elements 120 can be downsized.

In the present embodiment, the millimeter-wave antenna modules 501, 502, 503, and 504 are four-element patch array antennas, each having four patch antennas. The millimeter-wave antenna modules of the smartphone to be protected by the smartphone cover 100 are not limited. The millimeter-wave antenna modules may include, for example, antennas (e.g., dipole array antennas) other than patch antennas.

The wireless terminal cover can suppress a decline in antenna performance even when the wireless terminal is stored in the cover.

The disclosed embodiment and modification can be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

DESCRIPTION OF THE REFERENCE NUMERALS AND SYMBOLS

100: smartphone cover
1001: ground
1002: substrate
1003: patch antenna
1004: stacked patch
101: bottom part
102, 103: wall part
110: storage space
120: conductive element
500: smartphone
501, 502, 503, 504: millimeter-wave antenna module
5021: patch antenna
511, 512: side

What is claimed is:

1. A wireless terminal cover to be attached to a plate-like wireless terminal, the wireless terminal cover comprising:
   a bottom part that covers a backside of the wireless terminal and is made of a dielectric having a relative dielectric constant of 1 to 10;
   wall parts that surround sides of the wireless terminal and are made of the dielectric; and
   a plurality of conductive elements which do not connect to a feed line and are placed in line on at least one of the bottom part and the wall parts, wherein the conductive elements are formed such that a length of longest one of lines, each of which connects any two points on the conductive element, is 0.1 to 0.4 times an effective wavelength of radio waves in the dielectric, the radio waves being used for radio communications by the wireless terminal.

2. The wireless terminal cover according to claim 1, wherein
   the plurality of conductive elements includes a conductive element that is polygonal in front view, and
   the longest one of the lines is longest line of a length of one side of the polygonal conductive element or diagonal lines of the polygonal conductive element.

3. The wireless terminal cover according to claim 1, wherein
   the plurality of conductive elements includes a conductive element that is circular in front view, and
   the longest one of the lines is a diameter of the circular conductive element.

4. The wireless terminal cover according to claim 1, wherein the plurality of conductive elements is disposed at regular intervals.

5. The wireless terminal cover according to claim 1, wherein the plurality of conductive elements includes a set of adjacent conductive elements spaced with a first pitch and a set of adjacent conductive elements spaced with a second pitch that is different from the first pitch.

6. The wireless terminal cover according to claim 1, wherein the plurality of conductive elements is provided in the dielectric.

7. The wireless terminal cover according to claim 4, wherein the plurality of conductive elements includes adjacent conductive elements spaced with a pitch that is 0.5 times the effective wavelength.

8. The wireless terminal cover according to claim 7, wherein
   the radio waves are millimeter radio waves, and
   the pitch ranges from 0.16 mm to 6.25 mm.

9. The wireless terminal cover according to claim 1, wherein
   the radio waves are millimeter radio waves, and
   the length of the longest one of the lines ranges from 0.032 mm to 5 mm.

* * * * *